Patented Jan. 8, 1935

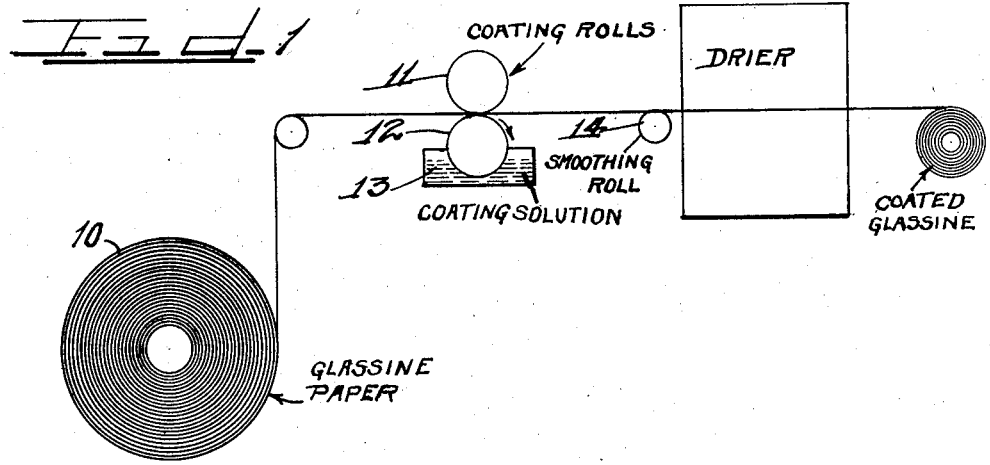
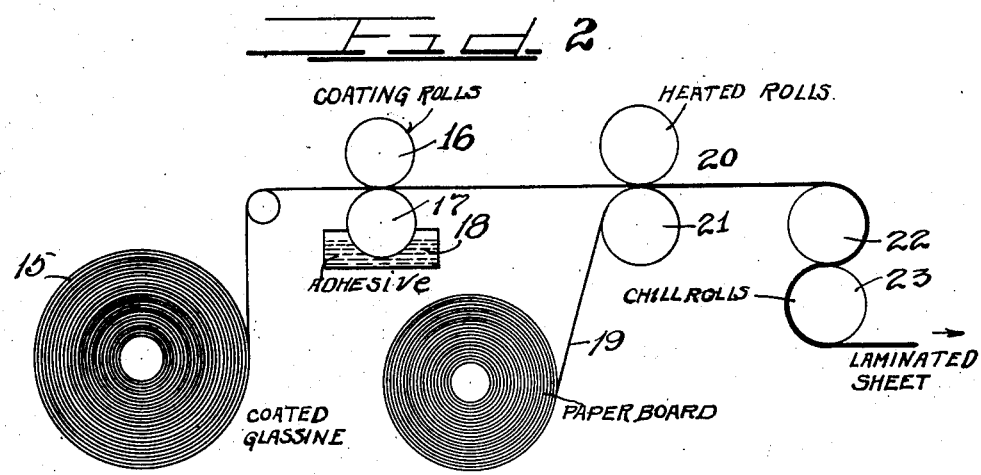
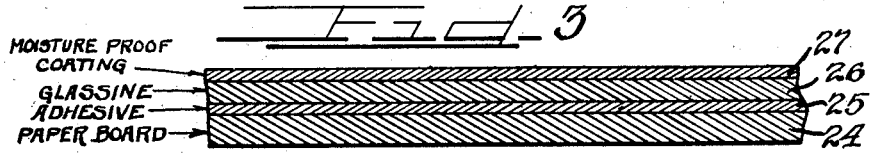

1,986,954

UNITED STATES PATENT OFFICE 1,986,954

LAMINATED SHEET MATERIAL

Allen Abrams, Wausau, Paul L. Anthony, Neenah, George J. Brabender, Wausau, and Winfred H. Graebner, Neenah, Wis., assignors to Marathon Paper Mills Company, Rothschild, Wis., a corporation of Wisconsin Application April 6, 1933, Serial No. 664,714

11 Claims. (Cl. 154—40)

This invention relates to laminated sheet material and more particularly to laminated material either in sheet or web form so constructed and put together as to be relatively proof against the transmission therethrough of water, moisture (water vapor), greases and air or other gases. Primarily, also the material of our invention is free from odors that might contaminate food products placed in contact with the sheet material or contained within cartons or receptacles made from the laminated sheet material.

Our invention is more particularly applicable to the building up of a laminated sheet material having a base fiber board or paper board of the types and thicknesses commonly used in the manufacture of cartons and containers. The term "fiberboard" is used herein to designate these types of board generically. Our invention especially contemplates the manufacture of laminated material having a high degree of moisture-, water- and greaseproofness, so that the material may be satisfactorily used in the construction of linerless containers or cartons for foods, the moisture content of which it desirable to retain, or regulate during packaging or storing. In its preferred embodiment, our invention comprises a laminated, moistureproof fiberboard especially well suited for use in the making of cartons for frozen foods.

In general, in the manufacture of moistureproof fiberboard for use in the construction of food cartons or containers, it is unsatisfactory to apply a lacquer or varnish directly to the fiberboard, first, because of the expense entailed and secondly, because of the difficulty in removing the solvent and solvent odors from the coated fiberboard. Owing to the comparative thickness and porosity of fiberboard, the quantity of lacquer or varnish necessary to coat the board renders the operation uneconomical, since much of the lacquer or varnish is absorbed by and penetrates into the body of the board, with consequent waste of the moistureproofing lacquer or varnish. Likewise, because of the penetration of the lacquer or varnish and accompanying solvents into the fiberboard and their absorption by the fibers, it is almost impossible to eliminate the solvents and attendant odors completely from the board. Since the solvents and their odors in most lacquer or varnish coating compositions are very objectionable when the board is to be used in making cartons or containers for foods, the problem of completely removing the solvent and odors from the board after coating is a very serious one.

We have now found that laminated sheet or web material having the desired properties can be satisfactorily and economically manufactured without coating the fiberboard directly with any solvent coating. In its preferred form, the invention comprises a composite or laminated board having a fiberboard base, a paper which resists the penetration of lacquer solvents adhesively secured to said base, preferably with a waterproof and/or moistureproof glue or cement, and a moistureproof coating on the exposed surface of the paper layer. In making up the sheet or web material of our invention, moistureproofness of the finished product is obtained by applying a moistureproof or relatively moistureproof lacquer or varnish to a sheet, such as a greaseproof paper, glassine, vegetable parchment, or the like. This type of paper has the common property of resisting penetration by the ordinary lacquer solvents and is hereinafter, for brevity, referred to generically as a solvent resistant paper. Preferably the moistureproof coating is applied to only one side of the solvent resistant paper and the other side of the paper is secured to the fiberboard base by means of an adhesive which is free from odor and/or which leaves no appreciable residual odor after drying—especially a water vehicle adhesive such as hereinafter described. This construction of the composite or laminated sheet or web material eliminates the possibility of residual solvents or odors in the product and provides a sheet material that is substantially water-, moisture- and greaseproof and therefore suitable for use in making cartons and containers for foods and the like.

It is therefore an important object of this invention to provide a composite or laminated material in sheet or web form that is highly resistant to the penetration of water, water vapor, greases and oils, air and other gases and that is free from objectionable odor or taste.

It is a further important object of this invention to provide a composite fiberboard material admirably suited for use in the manufacture of cartons or containers for foods and other products where the control or maintenance of a definite moisture content in the packaged product is important.

It is a further important object of this invention to provide an efficient and economical method of making composite or laminated sheet or web material possessed of a high degree of water-, vapor- and greaseproofness and free from objectionable odor or taste.

Other and further important objects of this invention will become apparent from the following description and appended claims.

This invention (in a preferred form) is illustrated in the drawing and hereinafter more fully described.

On the drawing:

Figure 1 is a diagrammatic view illustrating the first coating step in preparing laminated sheet material of our invention.

Figure 2 is a diagrammatic view illustrating the building up of a composite web material.

Figure 3 is a fragmentary sectional view, greatly enlarged, of a composite or laminated board of our invention.

Although our invention is applicable to the manufacture of laminated sheet or web material using many different types of component sheets or webs, the invention contemplates the use of at least one component sheet or layer of a relatively thin, closely formed sheet of paper referred to herein as a solvent resistant paper. Examples of this type of paper are glassine and parchment, both of which are characterized by being made from well hydrated stock. Since glassine is the preferred type of paper used in making up a laminated sheet material of our invention, the invention will be described as embodying the use of glassine paper.

As illustrated in Fig. 1, a roll of glassine paper 10 is suitably coated by passing it between coating rolls 11 and 12, the latter of which is partially immersed in a bath 13 of the coating solution. The web of glassine, after being coated on one side, is passed over a smoothing roll 14 and through a drier to dry the coating by evaporation of the volatile solvents. The coated glassine is then wound into a roll or carried directly through the subsequent operations.

Because of its close, firm texture and the well hydrated character of its fibers, glassine is admirably suited for receiving a moistureproof coating. The organic solvents commonly used in lacquers and varnishes for moistureproof purposes do not, in general, penetrate glassine very deeply, but remain on or closely adjacent the coated surface, from which these solvents may be readily removed during the drying operation. Furthermore, glassine presents a smooth, dense surface and because of this, can be easily and economically coated with a continuous film of the moistureproofing composition. In general, from 3 to 4 pounds of coating solids per ream of paper consisting of 3,000 square feet afford a sufficiently thick and impervious coating to impart the desired water-, moisture- and greaseproof properties to the coated sheet.

In contrast, if the same coating composition were applied to fiberboard, at least 8 to 10 pounds of coating solids would be required for the same area to accomplish comparable results. This is largely due to the comparative roughness of the surface of fiberboard and its porosity o penetrability toward the coating composition. Furthermore, as previously pointed out, the coating directly of fiberboard presents the added problem of producing an odorless product and an added expense in the drying of the coated board and the removal therefrom of the volatile solvents.

The glassine is preferably coated on but one side so as to permit the other side to be adhesively secured to the base layer of fiberboard. As illustrated in Fig. 2, a roll 15 of coated glassine is unreeled and the coated glassine passed between coating rolls 16 and 17, the latter of which dips into a bath of a suitable adhesive or cement 18 and applies the adhesive to the uncoated side of the glassine. Fiberboard 19 is drawn, together with the coated glassine, between combining rolls 20 and 21, which can be run at either hot or cold temperatures, to unite the fiberboard and coated glassine together through the medium of the adhesive supplied by the coating roll 17 to the glassine. After passing through the rolls 20 and 21, the laminated web may be passed between rolls 22 and 23, which, if the rolls 20 and 21 are heated, may be chilled to set the adhesive and integrally unite the component layers of laminated web material. Neither heated nor chilled rolls need be used with certain types of adhesives.

The final product, as illustrated in Fig. 3, comprises a layer 24 of fiberboard, a film 25 of adhesive integrally uniting a sheet 26 of glassine to the fiberboard 24, and an outside film or coating 27 of moistureproof lacquer or varnish. In addition, there may be an outermost layer of paraffin wax on one or both sides, as later pointed out in greater detail. Various types of moistureproof coatings and various types of adhesives may be employed, but we prefer to use those that are described more particularly hereinafter.

The moistureproof coating is preferably of the nitrocellulose type, although gum or resin varnishes may be used, without a cellulosic derivative as an an ingredient thereof, but at some sacrifice of moistureproofness. A suitable moistureproofing lacquer, comprising from 15 to 35% of so-called "solids" in a mixture of organic solvents, may be prepared on the basis of the following formulae:

*Solids*

| | Parts dry weight |
|---|---|
| Regular soluble nitrocellulose (½ sec. viscosity) | 44 |
| Modified ester gum | 15 |
| O-tricresyl phosphate | 24 |
| *Spermaceti | 9 |
| Low freeze paraffin oil | 8 |

*Stearic acid may be substituted for spermaceti.

*Solvents*

| | Parts by weight |
|---|---|
| Toluol | 97 |
| Ethyl acetate | 79 |
| Butyl alcohol | 26 |
| Ethyl alcohol | 31 |

Tricresyl phosphate and paraffin oil, although liquids at ordinary temperatures, because of their low vapor pressure at drying temperatures, remain in the coating film and are therefore classified under "Solids".

As will be well understood by those skilled in the lacquer art, the percentages given above may be varied considerably and other ingredients substituted for those specified. The major constituents of the lacquer solids are a cellulosic derivative, such as nitrocellulose or ethyl cellulose, a gum or resin, such as modified ester gum, dammar, or a synthetic resin; and a plasticizer, such as ortho tricresyl phosphate, triphenyl phosphate, dibutyl phthalate, odorless castor oil, or the like.

Various mineral oils, such as the so-called refined mineral oils, Russian white oil, and the like, may be used as a tempering agent in place of the paraffin oil specified in the above "Solids" formula, but we prefer to use a particular grade of non-volatile and odorless paraffin oil, such as that manufactured and sold by the Deep Rock Oil Co. and known to the trade as "No. 1002". This paraffin oil has been produced by cooling to a temperature of minus 50° C. in order to free the oil of any paraffin or other normally solid substance.

In general, any petroleum base oil of the general character indicated may be used. Paraffin oil acts to prevent the moistureproofing material from "spewing", so that larger proportions of moistureproofing material can be used to advantage in the moistureproofing of the sheet. If no tempering agent is used, the moistureproofing material has a tendency to crystallize in the coating film and this is objectionable as it reduces the transparency of the film and also the resistance of the film to the penetration of moisture vapor. While excessive amounts of paraffin oil would be objectionable because giving an oily or greasy appearance and feel to the surface of the coated material, small amounts of paraffin oil serve to disperse the moistureproofing material and to prevent it from spewing out, even at the low temperatures to which cartons made from our material may be subjected in the frozen food industry.

The use of water soluble or water miscible compounds in the solvent mixture should be avoided or reduced to a minimum so far as possible, where a clear transparent coating is desired, since relatively large proportions of water soluble or water miscible compounds in the solvents used tend to give a milky or opaque appearance to the surface coating.

Where a moistureproofing agent is to be used in the lacquer, such materials as spermaceti, beeswax, carnauba wax or the like, or a high molecular weight fatty acid, such as stearic acid may be employed. The combination of the plasticizer and such materials is largely responsible for the moistureproof quality of the applied coating, but a considerable degree of moistureproofness may be obtained even when these materials are omitted from the lacquer formula, as compared with an uncoated board. The non-moistureproofing lacquers, viz. those in which the moistureproofing agent has been omitted, nevertheless impart some resistance to the penetration of moisture and water and considerable resistance to the penetration of greases. Furthermore, if the moistureproofing material is omitted from the coating, a very substantial degree of moistureproofness may be obtained by coating the laminated material on the glassine side or on both sides with paraffin wax. The wax is best applied in a hot molten condition in a manner well known to those skilled in the art.

Glassine coated with a nitrocellulose lacquer of the above formula is most suitably dried at a sufficiently high temperature to obtain a rapid and therefore economic drying operation—a temperature which is generally above the melting point of the particular moistureproofing material used.

The temperature at which the lacquer coated sheet or web material is dried will have some effect, however, upon the degree of moistureproofness of the coated material. We have found, using either spermaceti or stearic acid, that if the coated sheet material is dried at a temperature above the melting point of the spermaceti or stearic acid, say about 200° F., the degree of moistureproofness of the coated sheet is somewhat better than if the drying is carried out at a temperature below the melting point of these ingredients, say about 130° F. However, drying either below or above the melting point of the moistureproofing ingredients gives a result that is highly satisfactory, as indicated in the following table of data:

| Name of moistureproofing ingredient | Lacquer applied | Temp. of drying | W. V. T. R.* (g/100 sq. in./24 hrs.) |
|---|---|---|---|
| | Lbs. | °F. | g. |
| Spermaceti | 5.3 | 130 | 0.34 |
| Do | 5.8 | 200 | .29 |
| Stearic acid | 5.2 | 130 | .58 |
| Do | 5.2 | 200 | .39 |

*The water vapor transmission rate is expressed in terms of grams of water vapor per 100 sq. in. in 24 hrs. at 70° F. and is determined by the method hereinafter referred to.

If it is not essential that the coating for the glassine be highly resistant to the penetration of water or water vapor (i. e. moisture), resinous types of coating composition may be employed that do not include a cellulosic derivative, such as a cellulose ester or ether. Also in place of, or in addition to, any solvent coating, a coating of paraffin wax alone may be applied either to the surface of the glassine lamination or to both sides of the composite board.

In general, a paraffin wax coating will greatly improve the moisture resistant qualities of our composite board, although if a moistureproof lacquer coating be first applied, the subsequently applied wax coating has proportionately less effect on the moistureproofness of the composite board but does actually lower the water vapor transmission rate.

The adhesive used in uniting the board and glassine laminations together is preferably one that does not require the use of an organic solvent, since the use of an organic solvent would render it difficult to eliminate entirely solvent odors from the composite sheet material, unless the adhesive were first applied to the uncoated side of the glassine paper and the solvent removed before uniting the glassine to the paper board. Any of the usual water vehicle types of adhesives, such as glue, starch, dextrin, casein and the like may be used.

Preferably, an adhesive is employed that will form a waterproof film between the paper board and glassine. Examples of this type of adhesive are rubber latex, either the unvulcanized, self-vulcanizing or vulcanizable type. It is also possible to employ a "hot melt" or "heat sealing" class of adhesive, such as thermoplastic resins, lacs and gums, synthetic resins of the phenol-formaldehyde type, chlorinated diphenyl resins and others. The use of such adhesives also enhances somewhat the degree of moistureproofness of the finished composite board, due to the moisture resistant properties of the adhesive itself.

One of the principal advantages of using an adhesive, such as a self-vulcanizing latex or other composition containing rubber, is that it forms a waterproof film between the surfaces that it unites. Another advantage is that the rubber ingredient of the adhesive provides a cushioning effect for the scoring rules where the composite board is used in the manufacture of cartons. Since the adhesive film remains permanently flexible, cracking of the glassine or surface coating is prevented when the board is bent or folded. The bond between the glassine and fiberboard is consequently a substantially permanent one, unaffected by water or moisture, or by heat or cold, within the ranges usually encountered by a product of this type.

Although ordinary rubber latex can be used as an adhesive, its use is objectionable in that, after application, the rubber content deteriorates. For this reason, it is much more satisfactory to use a self-vulcanizing rubber latex or similar composition. Compounds are commonly added to this type of latex that resist deterioration and aging of the rubber. The latex is applied cold.

Although the product of our invention in its preferred form comprises a composite board having one lamination of fiberboard and another lamination of glassine, it will be understood that other classes of cellulosic sheet material having the desired characteristics may be employed. As previously stated, the term "fiberboard" as herein used in the specification and claims is intended to cover the entire class of paper- or fiberboards in the various thicknesses commonly manufactured. Likewise, the term "solvent resistant paper" is herein used to designate paper which resists penetration by organic solvents.

The class of solvent resistant paper includes greaseproof paper, glassine and vegetable parchment. Greaseproof paper, as is well known, is generally made from sulphite stock that has been mechanically hydrated to a high degree of hydration. Glassine is the product that results from supercalendering greaseproof paper. Vegetable parchment, on the other hand, is made from stock that has been chemically hydrated, as by means of sulfuric acid.

One of the important uses of the product of our invention is in the manufacture of cartons or containers for frozen foods. Our product is well suited for this purpose for the reason that it is free from objectionable solvent or other odors, is substantially unaffected by the temperature and humidity conditions to which it may be subjected, and is substantially impermeable to the penetration of water, water vapor, and grease. In the manufacture of cartons for frozen foods, the coated glassine lamination provides the inner wall of the carton and the fiberboard, the outer wall. Since food products having a comparatively high water content are customarily frozen directly in the carton, it is very important that the inner surface of the carton be water- and moistureproof. In addition to these properties, the material of our invention is also substantially impervious to the penetration of air or other gases.

Another advantage in the use of our material for making cartons is that the fiberboard outer lamination provides a surface that is well suited to receive an ink impression or design, so that it can be directly printed prior to making the composite board up into cartons. After being printed, either one or both surfaces of the composite fiberboard may be coated with paraffin wax, if desired. This procedure even further enhances the imperviousness of the product to the penetration of water, moisture and grease.

The term "moistureproof" is, of course, a relative term but as here used is intended to indicate a resistance to the transmission of water vapor such that not more than one gram of water vapor will be transmitted through the sheet material being tested, per 100 square inches of sheet material in 24 hours at 70° F., when measured by the method described by Allen Abrams, page 24 of "The Paper Mill", vol. 8, No. 38 (Sept. 20, 1930). The finished composite or laminated board material of our invention, as prepared by the method disclosed herein, will, in general, transmit less than 1.0 gram of water vapor per 100 square inches in 24 hours at 70° F., when tested by this method.

Where it is important to obtain the highest degree possible of resistance of our product to the transmission of water vapor, we prefer to use a nitrocellulose lacquer containing a moistureproofing agent, such as spermaceti or stearic acid, an adhesive of the self-vulcanizing latex type, and to apply an external coating of paraffin wax to the lacquer coated glassine lamination. When this method is used, for instance, in making up a laminated board from fiber board having a thickness of .016 inches and glassine paper, the final product will have a water vapor transmission rate of approximately 0.20 grams of water vapor per 100 square inches in 24 hours, when tested in accordance with the method referred to.

If a similar product is prepared, except for omitting the moistureproofing agent from the lacquer, the final product will have a water vapor transmission rate of approximately 0.70, when expressed in the same unit. The omission of the wax coating from the laminated product made with the use of a moistureproof nitrocellulose lacquer, raises the water vapor transmission rate from about 0.20 to about 0.35. The effect of the wax coating is much more pronounced, however, in the case of the laminated product using a non-moistureproofing lacquer, since in that case, if the wax coating is omitted, the water vapor transmission rate increases to about 6.0 units. This figure, however, is still much lower than the corresponding figure for the laminated board itself, without any lacquer or wax coating but using a self-vulcanizing rubber latex adhesive. In that case, the water vapor transmission rate is approximately 32 units.

We are aware that many changes may be made and numerous details of the invention may be varied through a wide range without departing from the principles and spirit of this invention, and we, therefore, do not purpose limiting the patent granted hereon otherwise than necessitated by the prior art.

We claim as our invention:

1. A laminated, water-, moisture-, and greaseproof sheet material free from objectionable odors, comprising a lamination of fiberboard and a lamination of glassine securely bonded to said fiberboard lamination by a waterproof adhesive, said glassine having a moistureproof coating on its outer surface only of the non-odorous residue of an odorous nitrocellulose lacquer containing a moistureproofing agent.

2. The method of making laminated sheet material that is water-, moisture-, and greaseproof and free from objectionable odors, which comprises applying a solution containing a moistureproofing agent to one side only of a greaseproof sheet, drying the sheet to remove the solvent, applying a water vehicle adhesive to the uncoated side of said sheet and uniting a layer of fiberboard to said adhesived surface.

3. The method of making laminated sheet material that is water-, moisture-, and greaseproof and free from objectionable odors, which comprises applying a solution containing a moistureproofing agent to one side only of glassine paper, drying the sheet to remove the solvent, applying a water vehicle adhesive to the uncoated side of said greaseproof sheet and uniting a layer of fiberboard to said adhesived surface.

4. The method of making laminated sheet material that is water-, moisture-, and greaseproof and free from objectionable odors, which comprises applying a solution containing nitrocellulose, a resin, a plasticizer and a moistureproofing agent to one side only of glassine paper, drying the glassine to remove the solvent, applying a water vehicle adhesive to the uncoated side of said glassine and uniting a layer of fiberboard to said adhesived surface.

5. The method of making laminated sheet material that is water-, moisture-, and greaseproof and free from objectionable odors, which comprises applying a solution containing nitrocellulose, a resin, a plasticizer and a moistureproofing agent to one side only of glassine paper, drying the glassine to remove the solvent, applying a vulcanizable rubber latex to the uncoated side of said glassine and uniting a layer of fiberboard to said adhesived surface.

6. The method of making laminated sheet material that is water-, moisture-, and greaseproof and free from objectionable odors, which comprises coating one side only of a sheet of glassine paper with a solution of nitrocellulose, a moistureproofing agent and a plasticizer, drying the coated glassine paper to completely remove the solvents therefrom, and uniting a sheet of fiberboard to the uncoated surface of said glassine paper by means of an adhesive that is free from organic solvents and forms a water-proof film.

7. The method of making laminated sheet material that is water-, moisture-, and greaseproof and free from objectionable odors, which comprises coating one side only of a sheet of glassine paper with a solution of nitrocellulose, a moistureproofing agent and a plasticizer, drying the coated glassine paper to completely remove the solvents therefrom, and uniting a sheet of fiberboard to the uncoated surface of said glassine paper by means of an adhesive containing rubber.

8. The method of making laminated sheet material that is water-, moisture-, and greaseproof and free from objectionable odors, which comprises coating one side only of a sheet of glassine paper with a solution of nitrocellulose, a moistureproofing agent and a plasticizer, drying the coated glassine paper to completely remove the solvents therefrom, and uniting a sheet of fiberboard to the uncoated surface of said glassine paper by means of a self-vulcanizing rubber latex.

9. The method of making laminated sheet material that is water-, moisture-, and greaseproof and free from objectionable odors, which comprises coating one side only of a sheet of glassine paper with a solution of nitrocellulose, a moistureproofing agent and a plasticizer, drying the coated glassine paper to completely remove the solvents therefrom, uniting a sheet of fiberboard to the uncoated surface of said glassine paper by means of a self-vulcanizing rubber latex and dipping the resulting composite sheet material in molten paraffin wax.

10. The method of making laminated sheet material that is water-, moisture- and greaseproof and free from objectionable odors, which comprises applying to one side only of a greaseproof paper a moisture proofing agent dissolved in a solvent having objectionable odors, drying said paper to remove said solvent and eliminate said odors and uniting the uncoated side of said paper to a layer of fiber board by means of an inodorous adhesive without the use of an organic solvent.

11. A laminated, water-, moisture- and greaseproof sheet material free from objectionable odors, comprising a lamination of fiber board and a lamination of greaseproof paper securely bonded to said fiber board lamination by an inodorous adhesive, said greaseproof paper having a moisture proof coating on its outer surface only, the sheet material being made in accordance with the method of claim 10.

ALLEN ABRAMS.
PAUL L. ANTHONY.
GEORGE J. BRABENDER.
WINFRED H. GRAEBNER.